2,953,482

Patented Sept. 20, 1960

2,953,482

PROCESS OF COATING REGENERATED CELLULOSE FILM WITH POLYETHYLENE AND RESULTANT ARTICLE

Floyd Ignatius Scherber, Washington, D.C., assignor to E. I. du Pont de Nemours and Company, Wilmington, Del., a corporation of Delaware No Drawing. Filed July 18, 1957, Ser. No. 672,563

8 Claims. (Cl. 117—145)

This invention relates to the production of polymeric coatings and more particularly to a process for producing, substantially odorless, printable polyethylene coatings which strongly adhere to the substrate.

Because of its outstanding flexibility, tear-strength, resistance to the deteriorating influence of greases, oils, and other agents encountered in the packaging field, a moderately low moisture permeability, heat-sealability, and low cost, polyethylene has been regarded as a potentially valuable protective coating for non-fibrous base films, particularly regenerated cellulose film, widely used in the packaging industry. However, the adhesion of polyethylene to other materials is generally so poor as to render it unacceptable as a coating in all applications where a tightly adhered coating is required. Moreover the common aniline and rotogravure inks customarily employed to imprint trademarks, advertising indicia, ornamental designs and the like on the coated surfaces do not adhere satisfactorily to polyethylene which constitutes a further impediment to its ready acceptance as a coating material. Treatments heretofore devised to overcome the aforementioned difficulties have in most instances been accompanied by degradation of the equally important heat-sealability of the coating, and/or rendered the coated surface objectionably tacky as to require an additional sizing step.

An object of this invention is to provide a process for producing a well adhered, printable, and substantially odor-free polyethylene coating on any desired substrate. A further object is to provide a process for producing a well adhered, printable, substantially odor-free coating of polyethylene on non-fibrous, flexible substrates such as regenerated cellulose film. These and other objects will more clearly appear from the description which follows.

The foregoing objects are realized by the present invention which, briefly stated, comprises (1) uniformly admixing a small concentration of an organic peroxide with a coating composition comprising essentially polyethylene dissolved in a volatile organic solvent; (2) substantially immediate thereafter applying said coating to the desired substrate; (3) heating the coated substrate at a temperature sufficient to volatilize the organic solvent but insufficient to appreciably decompose the organic peroxide until substantially all of the solvent has been removed from the coating; and (4) thereafter heating the coated substrate at a higher temperature effective to decompose the organic peroxide and cure the coating.

Because of its present commercial importance, this invention will hereinafter be specifically described with reference to the polyethylene of commerce (e.g., as disclosed in U.S.P. 2,219,700 to Perrin et al.). The invention, however, is equally applicable to the recently developed high density polyethylenes (i.e., having a density greater than 0.92–0.93), as well as to polyethylenes formed by copolymerizing ethylene with minor amounts of other aliphatic unsaturated hydrocarbons, such as propylene, butylene, isobutylene and the like. Furthermore, the invention includes copolymers formed by copolymerizing ethylene with small amounts of other polymerizable compositions such as styrene, vinyl acetate and similar types of vinyl unsaturated compounds. The polyethylene may be modified by the addition of other ingredients for special purposes. For example, natural or synthetic plastic materials including natural or synthetic, cured or uncured rubber, waxes, resins, butamin, plasticizers, and other synthetic resinous dyes and pigments, and mineral fillers such as finely-divided calcium carbonate or titanium dioxides may be used as modifiers.

In addition to the readily available benzoyl peroxide which is preferred for purposes of this invention, other representative organic peroxides which may be used with like effect are: acetyl peroxide, cumene hydroperoxide, di-t-butyl peroxide, t-butyl hydroperoxide, and succinyl peroxide and the like.

A critical feature of this invention is that the coating composition must be applied to the substrate substantially immediately after the organic peroxide has been admixed therewith. If application is delayed for longer than 10 minutes after the peroxide has been incorporated in the coating composition, the resulting coating will have an objectionable phenolic odor irrespective of how the coating is dried and cured. Preferably the coating should be applied within not more than 5 minutes after the addition of peroxide.

The organic peroxide may comprise from 0.1% to 10.0% of the total weight of peroxide and polyethylene (i.e., coating solids) in the solution, and preferably should be within the range of from 0.5% to 5.0% by weight. Volatile aromatic hydrocarbons such as toluene, benzene, xylene, etc., are preferred for the coating solvent.

The temperature and time for drying to remove solvent, and to effect a curing of the solvent-free coating will depend, of course, on the peroxide and solvent employed, and upon the concentration of solids in the coating solution, as well as upon each other in accordance with recognized principles of chemical kinetics. Preferably the initial or solvent-removal step should be carried out by heating the coated substrate at a temperature within the range of from 110° to 140° C., for from 5 to 30 seconds, followed by a curing step carried out at a temperature within the range of from 150° to 200° C., for from 5 to 30 seconds in a solvent-free atmosphere.

The preferred substrate is flexible regenerated cellulose film widely used in the packaging field. However, the present invention is applicable as well for the formation of adherent, odorless, printable coatings of polyethylene on substrates of any other material such as polyethylene terephthalate, vinylidene chloride polymers, polyvinyl fluoride, cellulose acetate, metals, glass, ceramics, leather, rubber, wood, etc., of any desired configuration, i.e., films, sheets, fabrics, filaments, rods, tubes, etc.

The following examples, presented in tabular form, will serve to further illustrate the principles and practice of this invention. Parts and percentages are by weight unless otherwise indicated.

In the examples, plain regenerated cellulose films 0.0009–0.0013" thick, were doctor knife-coated with the compositions and dried and cured under the conditions specified in Table I. In each of the examples, samples of coated film measuring 4" x 12" were printed with F. G. Okie "Pliolite" base letter press inks, "Excellobrite" W–500 ink, IPI Anilox Red OX–5012 (flexographic cellophane ink), Sinclair and Valentine Gravure Red PA–883 (cellophane ink) and Bensing Brothers and Deeney "Excellobrite" Red R–400 (flexographic ink), all were doctor roll applied by hand and cured at 100° C. for 3 minutes. The degree of ink laid on is important. If the ink lay down is too thin, thumbnail scuff and flex test will show

Table I

| Example No. | Bath Composition, Parts | | | 1st Stage Drying | | 2nd Stage Drying | | Heat Seal Strength in Grams | | Coating Strip Test | Printability | Odor |
| --- | --- | --- | --- | --- | --- | --- | --- | --- | --- | --- | --- | --- |
| | Polymer | Peroxide | Solvent | Temp., °C. | Time, sec. | Temp., °C. | Time, sec. | 35% RH | 81% RH | | | |
| 1 | Polyethylene, 100. | None | toluene, 900. | 160 | 10 | | | 50 | 10 | strips | 5 | good. |
| 2 | Polyethylene, 95. | benzoyl, 5 | toluene, 900. | 160 | 10 | | | 600 | 250 | no strip | 9 | poor. |
| 3 | Polyethylene, 95. | benzoyl, 5 | toluene, 900. | 120 | 10 | 175 | 10 | 650 | 300 | ___do___ | 10 | good. |
| 4 | Polyethylene, 95. | benzoyl, 5 | xylene, 450. | 130 | 15 | 190 | 5 | 725 | 285 | ___do___ | 10 | good. |
| 5 | Polypropylene, 95. | benzoyl, 5 | xylene, 900. | 130 | 20 | 175 | 20 | 520 | 185 | ___do___ | 9 | good. |
| 6 | Ethylene/pentene copolymer, 95. | benzoyl, 3 | benzene, 700. | 125 | 15 | 200 | 5 | 480 | 275 | ___do___ | 10 | good. |
| 7 | Ethylene/pentene copolymer, 95. | benzoyl, 3 | benzene, 700. | 175 | 15 | | | 450 | 275 | ___do___ | 10 | poor. |
| 8 | Polyethylene, 99.5. | t-butyl, 0.5 | toluene, 900. | 140 | 10 | 200 | 5 | 750 | 300 | ___do___ | 9 | good. |
| 9 | Polyethylene, 95. | benzoyl, 5 | toulene, 450. | 125 | 30 | | | 200 | 50 | strips | 6 | poor. |
| 10 | Polyethylene, 95. | cumenehydroperoxide. | xylene, 650. | 130 | 15 | 150 | 30 | 750 | 350 | no strip | 9 | good. | negative or poor printability regardless of the ink adhesion. The samples were aged for 48 hours or more under laboratory conditions (approximately 26° C. and 75% RH), and the entire 12" length was tested and evaluated.

In evaluating the printability, i.e., the strength of adhesive bond between the dried ink and the printed ethylene polymers surface, the criterion used in all cases was a pressure-sensitive tape strip test.

*Pressure-sensitive tape strip test.*—Pressure-sensitive tape was pressed against the printed surface, and then pulled off. The degree of ink adhesion as measured by pressure-sensitive tape stripping was rated on a 5–10 scale. After the printed surface was stripped with pressure-sensitive tape, a printability of:

10—Indicated that no ink was removed;
9—Indicated that small cracks of ink were removed;
8—Indicated that larger cracks of ink were removed;
7—Indicated that ⅓ of the ink was removed;
6—Indicated that more than ⅓ of the ink was removed;
5—Indicated that all of the ink was removed.

Heat-seal strength is a measure of the strength of the bond between two films when they are sealed together by heat and pressure. For the purpose of comparison and definition, the following test is used to measure the strength of the heat-seal bond: A piece of coated film 47" x 50" with the grain running in the long direction was cut into pieces 4" x 3", handling all pieces by the corners so as not to contact the areas to be sealed. Two pieces of the superimposed film were then sealed together at each end, at right angles to the grain, with the sealing bars 0.75" wide heated at 120° C. and 20 p.s.i. pressure and 2 seconds contact time. The sealed sheets were then cut in half at right angles to the grain, and each half was cut into 1.5" wide strips, parallel to the grain, and the center of the sheets resulting in four sets to be tested. Each set of the 1.5" wide sealed strips, after being conditioned in the desired atmosphere, was opened at the free ends, placed in a Suter testing machine and pulled apart. The force in grams required to pull the strips apart was taken as a measure of the heat-seal bond strength. It should be noted that the heat-seal strength of polyethylene coated regenerated cellulose film is a function of regenerated cellulose-to-polyethylene adhesion, and not of thermoplasticity of the coating unless the latter is very severely degraded.

Odor was determined by placing 1 square meter of the coated film in an open quart jar and closing the jar. After a period of 48 hours, the jar was opened and the odor tested promptly. Samples which were prepared in a single stage drying pattern, or on which the peroxide was added to the coating bath substantially more than 10 minutes before the coating operation, had a characteristic phenolic odor which is not desirable. Examples prepared by the two-stage process of this invention had no odors not associated with polyethylene coated regenerated cellulose film prepared without peroxide.

I claim:

1. A process for the production of adherent, printable, heat-sealable, substantially odorless coatings of polyethylene which comprises (1) uniformly admixing from 0.1% to 10.0% by weight of an organic peroxide, based on the combined weight of peroxide and polyethylene, with a coating composition comprising essentially a polyethylene dissolved in a volatile organic solvent, (2) substantially immediately thereafter applying said coating composition to a substrate, (3) heating the coated substrate at a temperature and for a time sufficient to effect removal of said volatile solvent but insufficient to appreciably decompose the organic peroxide, and (4) thereafter heating the coated substrate at a higher temperature effective to decompose the organic peroxide and cure the coating.

2. The process of claim 1 wherein the amount of organic peroxide is within the range of from 0.5% to 5.0% by weight.

3. The process of claim 1 wherein the substrate is regenerated cellulose film.

4. The process of claim 1 wherein the organic peroxide is benzoyl peroxide.

5. A process for the production of adherent, printable, heat-sealable, substantially odorless coating of polyethylene on regenerated cellulose film which comprises (1) uniformly admixing from 0.1% to 10.0% by weight of an organic peroxide, based on the combined weight of peroxide and polyethylene, with a coating composition comprising essentially a polyethylene dissolved in a volatile organic solvent, (2) applying said coating within not more than about 10 minutes to regenerated cellulose film, (3) heating the coated film at a temperature within the range of from about 110° to 140° C., for from 5 to 30 seconds, and (4) thereafter heating the coated film at a temperature within the range of from about 150° to about 200° C. for from 5 to 30 seconds.

6. The process of claim 5 wherein the organic peroxide is benzoyl peroxide.

7. The process of claim 5 wherein the volatile organic solvent is a liquid aromatic hydrocarbon.

8. Regenerated cellulose film having an adherent, printable, heat-sealable, substantially odorless coating of polyethylene, said coating being formed by the process of claim 5.

References Cited in the file of this patent

UNITED STATES PATENTS

| | | |
|---|---|---|
| 2,512,128 | Albright | June 20, 1950 |
| 2,628,172 | Jenett | Feb. 10, 1953 |
| 2,628,214 | Pinkney et al. | Feb. 10, 1953 |
| 2,668,134 | Horton | Feb. 2, 1954 |
| 2,696,448 | Hammer et al. | Dec. 7, 1954 |
| 2,715,077 | Wolinski | Aug. 9, 1955 |
| 2,767,103 | Loukomsky | Oct. 16, 1956 |
| 2,808,340 | Learn | Oct. 1, 1957 |

FOREIGN PATENTS

| | | |
|---|---|---|
| 149,565 | Australia | Aug. 4, 1949 |